United States Patent
Larson et al.

(10) Patent No.: US 6,692,399 B2
(45) Date of Patent: Feb. 17, 2004

(54) DIFFERENTIAL TORQUE LIMITER

(75) Inventors: Lowell V. Larson, Huntington Beach, CA (US); Mark A. Mourani, Huntington Beach, CA (US); Eric A. Polcuch, San Pedro, CA (US)

(73) Assignee: Moog Inc., East Aurora, NY (US)

( * ) Notice: Subject to any disclaimer, the term of this patent is extended or adjusted under 35 U.S.C. 154(b) by 22 days.

(21) Appl. No.: 10/025,305

(22) Filed: Dec. 19, 2001

(65) Prior Publication Data

US 2003/0114265 A1 Jun. 19, 2003

(51) Int. Cl.$^7$ .............................................. F16H 48/06
(52) U.S. Cl. .............................. 475/248; 249/263
(58) Field of Search ............................... 475/231, 240, 475/241, 248, 249, 263; 192/223.3

(56) References Cited

U.S. PATENT DOCUMENTS

| | | | |
|---|---|---|---|
| 4,932,929 A | * 6/1990 | Capewell ................. 475/174 |
| 5,071,397 A | * 12/1991 | Grimm ................. 475/263 |
| 5,630,490 A | * 5/1997 | Hudson et al. ........... 192/223.3 |
| 6,419,606 B1 | * 7/2002 | Tengan et al. .............. 475/5 |
| 6,443,034 B1 | * 9/2002 | Capewell et al. ....... 74/665 GA |
| 6,471,028 B1 | * 10/2002 | Larson ................ 192/223.3 |
| 2001/0002687 A1 | * 6/2001 | Fernand .................. 244/231 |

* cited by examiner

Primary Examiner—Rodney H. Bonck
Assistant Examiner—Dennis Abdelnour
(74) Attorney, Agent, or Firm—Phillips Lytle LLP

(57) ABSTRACT

A differential coupling (20) has a body (21), a rotary input member (22), and two rotary output shafts (23, 24). The algebraic sum of the angular displacements of the output shafts is proportional to the rotation of the input member. The improvement includes mechanical means (39), such as a planetary gear (42), for sensing a torque differential between the output shafts, and a brake (38) mounted on the body and operatively arranged to selectively brake rotation of the input member, or both output members, when the difference between the torques on the outputs exceeds a predetermined first value.

6 Claims, 1 Drawing Sheet

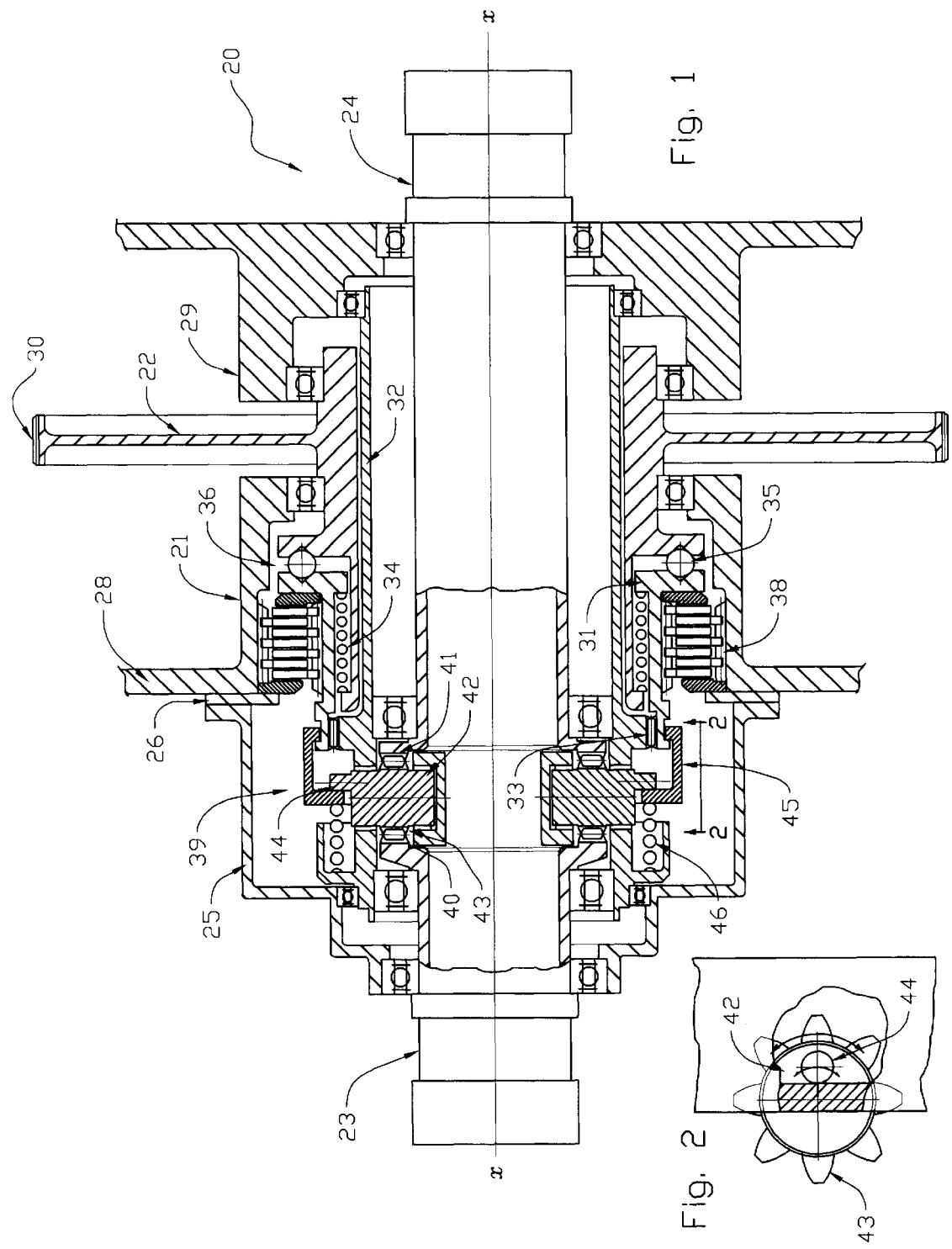

DIFFERENTIAL TORQUE LIMITER

TECHNICAL FIELD

The present invention relates generally to mechanical actuation systems for driving aircraft secondary flight control surfaces, and, more particularly, to an improved torque limiter, sensitive to differential output torque, that is particularly adapted to be used in such actuation systems.

BACKGROUND ARTS

Aircraft flight control surfaces are frequently driven by mechanical actuation systems. This method of control has been found to be efficient in terms of space and weight, and can inherently provide synchronization of airfoil surfaces. These mechanical systems generally incorporate torque limiters so that a jam at one point does not necessarily result in damage to other parts of the system.

In a typical installation, the system comprises a central power drive unit ("PDU"), which converts hydraulic or electrical power into mechanical power in the form of torque and rotational speed. The PDU will typically have two mechanical outputs, one for each wing, and each output will be protected with a torque limiter. The torque limiter is set to limit torque to a maximum value, which is typically equal to the total torque required for normal operation by the components in one wing, plus a margin of, say, thirty percent, to account for aircraft and flight condition variability and assembly tolerances. If this torque limit is exceeded, the limiter will lock the PDU input to ground, and all system motion will cease.

The system may drive two or more mechanical actuators in each wing. If one actuator jams, it will be subjected to the full torque limit setting that may be in excess of twice its normal operating load. All of the components of the system must be designed for this large load to prevent secondary damage.

DISCLOSURE OF THE INVENTION

With parenthetical reference to the corresponding parts, portions and surfaces of the disclosed embodiment, merely for purposes of illustration and not by way of limitation, the present invention broadly provides an improvement in a differential coupling (20) having a body (21), having a rotary input member (22), and having two rotary output members (23, 24), the algebraic sum of the angular displacements of said output members being proportional to the angular displacement of said input member, the improvement comprising: a detent mechanism (31, 45, 34) operatively arranged to prevent relative angular displacement between said output members whenever the difference between the torques acting on said output members is less than a first predetermined value, and to allow relative angular displacement between said output members whenever the difference between the torques acting on said output members is greater than said first predetermined value; a brake (38) mounted on said body and operatively arranged to be selectively applied to brake rotation of said input member; and a differential mechanism (43) having a mechanical output (44) proportional to the relative angular displacement between said output members, and operatively arranged to cause said mechanical output to energize said brake.

The relative angular displacement between said output members may be less than a second predetermined value. The detent mechanism may be arranged to constrain said mechanical output. The differential mechanism may be operatively arranged to apply said brake in proportion to the relative angular displacement between said output members. The differential mechanism may includes a planetary gear (43) rotatable about an axis and operatively engaging said output members, and wherein said differential mechanism is arranged to operate said brake as a function of the rotation of said planetary gear about said axis. The mechanical output may be a pin (44) located at an eccentric position on said planetary gear, and may further comprise a preloaded spring operatively engaging said pin to establish said first predetermined value.

Accordingly, the general object of the invention is to provide an improved coupling.

Another object is to provide an improved torque limiter, sensitive to differential output torque.

Another object is to provide protection against secondary system damage, due to downstream jams and disconnects, at a lower system weight than allowed by the prior art.

Still another object is to provide an improved coupling in which differential motion between two outputs is limited to a predetermined value.

These and other objects and advantages will become apparent from the foregoing and ongoing written specification the drawings, and the appended claims.

BRIEF DESCRIPTION OF THE DRAWINGS

FIG. 1 is a fragmentary longitudinal vertical sectional view of a first form of the improved coupling, this view showing the input gear, the two output shafts, the planetary gear for sensing the difference in torques on the output shafts, the brake, and the ball-ramp input torque sensor.

FIG. 2 is an enlarged fragmentary horizontal sectional view thereof, taken generally on line 2—2 of FIG. 1, and particularly showing the planetary gear and eccentric pin.

DESCRIPTION OF THE PREFERRED EMBODIMENTS

At the outset, it should be clearly understood that like reference numerals are intended to identify the same structural elements, portions or surfaces consistently throughout the several drawing figures, as such elements, portions or surfaces may be further described or explained by the entire written specification, of which this detailed description is an integral part. Unless otherwise indicated, the drawings are intended to be read (e.g., cross-hatching, arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate.

Referring now to the drawings, and, more particularly, to FIG. 1 thereof, the present invention provides an improved coupling, generally indicated at 20. The improved coupling is shown as having an assembled body, generally indicated at 21, a rotary input member 22, and left and right rotary output shafts 23, 24, respectively. The input member and output shafts are severally mounted on the body formation about horizontal axis x-x. The algebraic sum of the rotations of output shafts 23, 24 is proportional to the rotation of input member 22.

The assembled body is shown as broadly including (from left to right in FIG. 1) an end cap 25, a stop plate 26, a main housing 28, and a bearing support 29. These various body parts are suitably assembled and connected as shown to form the body assembly.

The input member 22 is a specially-configured member having an outer spur gear 30. An annular cam member 31 is shown as surrounding the left marginal end portion of input member 22 within the body. A cylindrical carrier member 32 is arranged radially inwardly of the input member. This carrier member 32 has near its center a splined connection, indicated at 33, with cam member 31. Thus, members 31 and 32 are constrained to rotate together. However, splined connection 33 permits cam member 31 to move axially relative to carrier member 32. A spring 34 acts between appropriate shoulders provided on the input member 22 and cam member 31, and urges cam member 31 to move rightwardly relative to the input member. A ball 35 is restrained between facing conical recesses extending into the input member 22 and cam member 31, respectively. This arrangement constitutes means, generally indicated at 36, for operating the brake, generally indicated at 38, in the event that the input torque exceeds a predetermined value.

Brake 38 is shown as having a plurality of interdigital disks, with alternating disks being connected to the body and to cam member 31, respectively, by means of various spline connections. Thus, if there is relative rotation between input member 22 and cam member 31, ball 35 will ride up on its conical seats, and will displace cam member 31 leftwardly against the opposing bias of spring 34 to exert a clamping force on the relatively-rotating disks of the brake assembly. This clamping force will produce a braking torque between the input member and the body.

The improved coupling also includes means, generally indicated at 39, for sensing the difference between the torques on the output shafts 23, 24. As best shown in FIG. 1, these two output shafts are hollow. The left shaft 23 has a spur gear 40 at its right marginal end, and the right shaft 24 has a similar spur gear 41 at its left marginal end. A planetary gear, generally indicated at 42, has a generally-cylindrical barrel that extends outwardly along a radial axis. The radial inward and outward ends of the planetary gear are received in journal bearings within carrier member 32. Gears 40 and 41 are in meshing engagement with a circumferential gear teeth, generally indicated at 43, mounted on the planetary gear. A pin 44 extends radially outwardly from the upper end face of the planetary gear at a location eccentric to the axis of planetary gear 42.

Thus, if output shafts 23 and 24 rotate together in the same direction and at the same angular speed, planetary gear 42 will not rotate about its axis. However, if there is relative rotation between output shafts 23 and 24, then gear 42 will rotate about its radial axis. Eccentric pin 44 will then swing in an arc about the axis of gear 42, and will displace member 45 leftwardly relative to carrier member 32. Since member 45 has a hooked engagement with the left marginal end portion of cam member 31, such leftward movement of member 45 will produce a corresponding leftward motion of cam member 31, to again exert a clamping force on brake 38. Spring 46 acts between a rightwardly-facing shoulder on a leftward extension of carrier member 32 and the left end face of member 45.

Thus, during normal operation, input member 22 is rotated about coupling axis x-x. If the torque on the output members is less than a predetermined torque, then ball 35 remains seated between the facing conical seats provided on cam member 31 and input member 22. Hence, rotation of input member 22 will normally cause corresponding rotation of cam member 31 and carrier member 32. Suitable bearings are provided on the body to accommodate this rotation. If members 31 and 32 rotate with the input member, and if there is no relative rotation between the two output members, then the two output members will simply rotate together about axis x-x.

However, if there is a differential torque on the output members 23, 24 that causes relative rotation therebetween, then the several planetary gears 42 will rotate about their respective axes. The eccentric pins 44 mounted on these planetary gears will then displace member 45 leftwardly, overcoming the bias of spring 46. This will, in turn, displace cam member 31 leftwardly against the bias of spring 34, and will cause a frictional engagement of the relatively-rotating brake disks. Thus, in the event that a differential torque on the output shafts causes relative rotation therebetween, such relative rotation will produce a braking action on the two output shafts and on the input shaft.

Alternatively, if the input torque exceeds a predetermined value, then ball 35 will ride up on its facing conical seats, and displace cam member 31 leftwardly to cause a similar braking action.

Modifications

The present invention expressly contemplates that many changes and modifications may be made. For example, while the output shafts are shown as being hollow, they may alternatively be solid. Similarly, the meshing differential gears of the planetary members and the two output members could bevel gears, instead of the spur gears shown in the drawings. Also, the improved coupling could be designed to limit at a different differential torque value for each of the two outputs. This could be achieved by providing two separate gears with differing tooth counts, displaced axially along each planetary member and engaging separately with the two output members. The planetary gear and eccentric pin are only one possible means for sensing a torque differential between the output shafts. The input member may be a gear or some other type of mechanism. The number and configurations of the planetary gears may also be changed. Similarly, the structure of the brake mechanism may be also changed or modified, as desired. One alternative would be a capstan-spring type of brake mechanism, and a second alternative would be a differential ball-ramp-plate type of brake. Both of these alternative mechanisms would be operated directly by the differential torque and motion of the two output members, and not by the eccentric pin-planetary gear mechanism shown in the drawings. Similarly, the capstan-spring mechanism could be arranged to brake both output shafts simultaneously, or the input member. The differential ball-ramp-plate implementation may be arranged to brake either the input or both outputs.

Therefore, while the presently-preferred form of the improved differential coupling has been shown as described, and several modifications thereof discussed, persons skilled in this art will readily appreciate that various additional changes and modifications may be made without departing from the spirit of the invention, as defined and differentiated by the following claims.

What is claimed is:

1. In a differential coupling having a body, having a rotary input member and having two rotary output members, the algebraic sum of the angular displacements of said output members being proportional to the angular displacement of said input member, the improvement comprising:

a detent mechanism operatively arranged to prevent relative angular displacement between said output members whenever the difference between the torques acting on said output members is less than a first predetermined value, and to allow relative angular displacement between said output members whenever the difference between the torques acting on said output members is greater than said first predetermined value;

a brake mounted on said body and operatively arranged to be selectively applied to brake rotation of said input member; and a differential mechanism having a mechanical output proportional to the relative angular displacement between said output members, and operatively arranged to cause said mechanical output to energize said brake.

2. The improvement as set forth in claim 1 wherein the relative angular displacement between said output members is less than a second predetermined value.

3. The improvement as set forth in claim 1 wherein said detent mechanism is arranged to constrain said mechanical output.

4. The improvement as set forth in claim 1 wherein said differential mechanism is operatively arranged to apply said brake in proportion to the relative angular displacement between said output members.

5. The improvement as set forth in claim 1 wherein said differential mechanism includes a planetary gear rotatable about an axis and operatively engaging said output members, and wherein said differential mechanism is arranged to operate said brake as a function of the rotation of said planetary gear about said axis.

6. The improvement as set froth in claim 5 wherein said mechanical output is a pin located at an eccentric position on said planetary gear, and further comprising a preloaded spring operatively engaging said pin to establish said first predetermined value.

* * * * *